Jan. 19, 1926. 1,570,277
J. L. PARKS
COTTON CHOPPER
Filed August 3, 1925 2 Sheets-Sheet 1
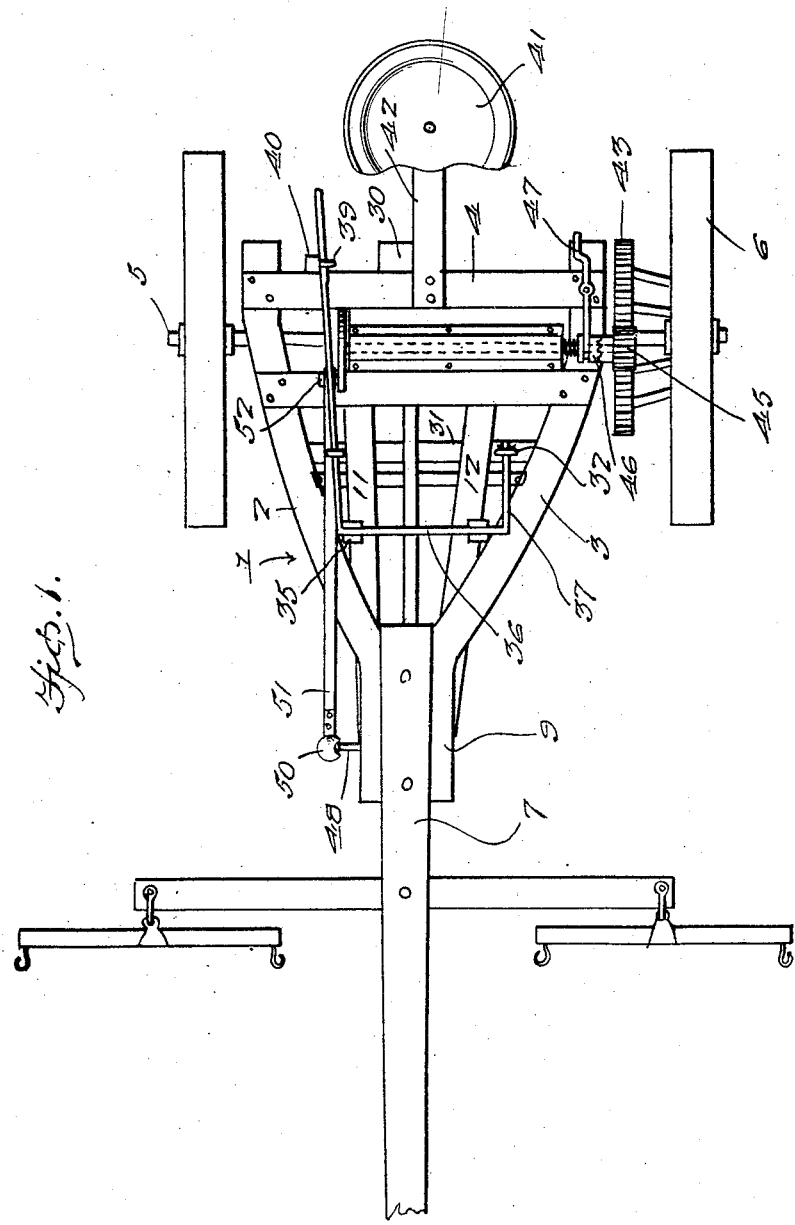

Jan. 19, 1926. 1,570,277
J. L. PARKS
COTTON CHOPPER
Filed August 3, 1925    2 Sheets-Sheet 2
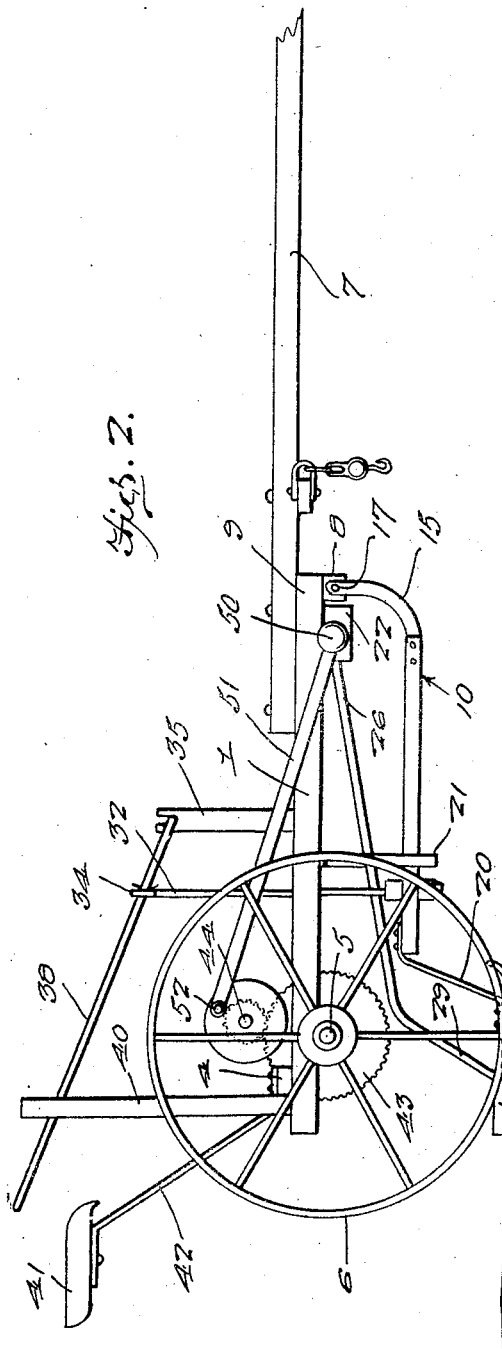
Inventor
J. L. Parks
By Clarence A. O'Brien
Attorney Patented Jan. 19, 1926.

1,570,277

UNITED STATES PATENT OFFICE.

JOSEPH L. PARKS, OF HENDERSON, NORTH CAROLINA.

COTTON CHOPPER.

Application filed August 3, 1925. Serial No. 47,799.

*To all whom it may concern:*

Be it known that I, JOSEPH L. PARKS, a citizen of the United States, residing at Henderson, N. C., Route #4, in the county of Vance and State of North Carolina, have invented certain new and useful Improvements in a Cotton Chopper, of which the following is a specification.

This invention relates to improvements in cotton chopping machines, and has for its principal object to provide a cotton chopping blade or hoe which is adapted for oscillatory movement in a direction transverse to the rows of cotton over which the machine travels.

Another important object of the invention is to provide a cotton chopper which includes a main wheeled frame, and a supplemental frame, the latter being pivotally supported on the main frame, and adapted for vertical movement, ground engaging guide shoes being arranged on the supplemental frame which are adapted to slide along the ground on each side of the rows of cotton, a vertically movable arm being supported at its forward end on the main frame and carrying a cotton chopping blade at the rear end which is disposed between the guide shoes, means being further provided for effecting the oscillatory movement of the arm and the chopping blade during the use of the machine whereby the cotton may be readily and efficiently chopped or beaten.

A further object is to provide a cotton chopper of the above mentioned character wherein means is provided for facilitating the raising of the supplemental frame which carries the guide shoes, so that the guide shoes will not engage the ground when the machine is not in operation, the vertical movement of the supplemental frame and the chopping blade carrying arm compensating for the unevenness of the ground over which the machine is to travel when chopping the cotton.

A still further object is to provide a cotton chopper of the above mentioned character, which is simple in construction, inexpensive, strong and durable, and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the same:

Figure 1 is a top plan view of the cotton chopper embodying my invention.

Figure 2 is a side elevation.

Figure 3 is a bottom plan view of the supplemental frame, showing the manner in which the same is associated with the forward portion of the main frame, and further illustrating the arm which carries the chopping blade at the rear end thereof, and Figure 4 is an enlarged detail of the ball and socket joint for the forward end of the arm, and the forward end of the pitman rod.

In the drawing, wherein for the purpose of illustration is shown the preferred embodiment of my invention, the numeral 1 designates generally the main frame, the same comprising the beams 2 and 3 respectively which gradually converge toward their forward ends, the forward ends of these beams being disposed in parallel relation, and being secured together in any suitable manner. Suitable cross pieces 4 extend between the rear portions of the beams for bracing the same.

The rear portion of the frame is supported on the axle 5, and mounted on the respective ends of the axle are the ground engaging or traction wheels 6. A draft tongue 7 extends forward from the forward ends of the converging beams of the main frame.

A block 8 is arranged on the bottom of the forward end of the head 9 which is formed on the forward ends of the converging beams of the main frame, and the purpose of this block will be presently apparent.

A supplemental floating frame, designated generally by the numeral 10 is arranged below the main frame 1, and said supplemental frame includes the forwardly converging beams 11 and 12, a cross piece 14 providing the connection between the forward ends of these beams. The forward end of the supplemental floating frame 10 is pivotally associated with the main frame through the medium of the substantially U-shaped member 15, the crown portion of which is secured to the forward edge of the cross piece 14, as at 16. The upper free ends of the arms of the U-shaped member 15 are pivotally secured to the block 8 by the pivots 17, it being understood of course that the arms of the U-shaped member 15 are curved as illustrated more clearly in Figure 2. In this manner, the supplemental floating frame 10 is adapted for vertical movement for the purpose to be hereinafter more fully described.

A pair of ground engaging guide shoes, or skids 18 and 19 respectively, are secured on the lower ends of the supporting brackets 20, the latter being secured at their upper ends to the rear ends of the beams 11 and 12 respectively of the supplemental floating frame 10. The forward end of each of the guide shoes is curved upwardly so that the same will not dig into the ground when the cotton chopper is in operation.

For the purpose of limiting the downward movement of the supplemental floating frame 10, there is provided the substantially U-shaped bracket 21, the upper free ends of the arms of which are secured to the intermediate portions of the beams 2 and 3 of the main frame 1.

An enlarged block 22 is secured on the bottom of the head 9 at a point rearwardly of the smaller block 8, and formed in the block is the ball shaped socket 23. An opening 24 is formed in the rear face of the block 22, and this opening tapers gradually towards the socket 23, as shown more clearly in Figure 4. A similar opening 25 is formed in one of the side faces of the block, and the opening 25 also tapers gradually toward the socket 23 with which the same communicates.

An elongated arm 26 is disposed longitudinally between the main frame, and the supplemental floating frame 10, the forward end of the arm having secured thereon the shank 27, on the forward end of which is arranged the ball shaped head 28 which head fits within the socket 23 so that a ball and socket joint between the forward end of the arm and the block 22 is provided. The rear end of the arm 26 is disposed downwardly, and slightly rearwardly as shown in 29, in Figure 2, and carried by the lower end of the same is the chopping blade or hoe 30. The latter being slightly curved.

Thus far, it will be seen that means has been provided for permitting the vertical movement of the floating frame 10, and the arm 26 which supports the cotton chopping blades 30, and should any irregularities be encountered by the shoes, or chopping blade, when the cotton chopper is in operation, the elements will automatically be raised so as to pass over the obstructions, or irregularities in the ground without causing any damage to the same.

For the purpose of holding the supplemental floating frame 10 in a raised position, I provide a clamp designated generally by the numeral 31, which is secured transversely on the beams 11 and 12 of the floating frame 10. An elongated rod 32 extends upwardly from each end of the clamp 31, and the upper ends of these rods have the eyes 34 formed thereon. A pair of brackets 35 extend upwardly from the main frame 1 adjacent the intermediate portion of the beams 2 and 3, and the upper ends of these brackets are notched to receive the intermediate portion 36 of a suitable operating rod. One end of this rod is disposed rearwardly and extends through the eye 34 of one of the rods 32, this portion of the operating rod being indicated at 37. The other end portion 38 of the operating rod also extends rearwardly through the eye 34 of the other rod 32, and the rear portion of the end portions 38 of the operating rod passes through an eye 39 which is arranged on the inner side of an upright 40 adjacent the upper end thereof, said upright being arranged at the rear end of the main frame. The free end of the elongated portion 38 of the actuating rod will thereby be disposed within easy reach of the operator of the cotton chopper who occupies the seat 41, the support for the latter being shown at 42.

For the purpose of effecting the oscillatory movement of the arm 26, and the chopping blade 30 carried by the rear end thereof simultaneous with the forward movement of the cotton chopper, there is provided on the axle 5 the gear wheel 43, a driven shaft 44 is supported on the main frame 1, as arranged transversely thereof. A pinion 45 is carried by one end of the driven shaft 44, and this pinion meshes with the gear 43 whereby the driven shaft will be actuated simultaneous with the rotation of the ground engaging wheels 6. A clutch mechanism designated generally by the numeral 46 of any well known construction is associated with the driven shaft for moving the same into and out of engagement with the pinion, the lever 47 for controlling the clutch mechanism being supported on the frame so as to be readily accessible to the operator.

Extending laterally from the head 28 which is seated in the ball shaped socket 23 is the arm 48, the same also extending through the opening 25. A ball shaped head 49 is formed on the outer end of the laterally extending arm 48, and is received in the ball shaped socket 50 provided therefor in the forward end of an elongated pitman rod 51 whereby a ball and socket connection between the laterally extending arm 48 and the pitman rod 51 is provided. This pitman rod is connected to the other end of the driven shaft 44 through the medium of the eccentric designated generally by the numeral 52.

It is obvious that when the clutch 46 is thrown in, the shaft 44 will be driven through the medium of the gear and pinion 43 and 45 respectively, and through the medium of the eccentric and pitman rod, an oscillatory movement will be imparted to the arm 48, and to the arm 26, on the rear end of which is carried the chopping blade 30, thus causing the chopping blade to oscillate in a direction transverse to the line of travel of the machine so that the cotton rows will be engaged by the blade and chopped, or thinned out in the manner well known in the art. By throwing out the clutch, the shaft 44 is disconnected so that the oscillatory movement of the arms 26 and 48 will be stopped.

A cotton chopper of the above mentioned character will at all times be positive and efficient in its operation, and the simplicity in which the same is constructed enables the parts to be readily assembled, or disassembled, and easily operated.

While I have shown the preferred embodiment of my invention, it is to be understood that minor changes in the size, shape and arrangement of parts may be resorted to without departing from the spirit of the invention, and the scope of the appended claims.

Having thus described the invention, what I claim as new is:—

1. A cotton chopper comprising a main wheel frame, a supplemental frame pivotally supported below the main frame and adapted for vertical movement, ground engaging guide shoes carried by the supplemental frame, an elongated arm, a chopping blade carried by the rear end thereof, a socket member arranged on the forward end of the main frame, a ball shaped head carried by the forward end of said arm, and disposed within said socket, an arm extending laterally from the ball shaped head through the opposite side of the socket, and means for actuating said last mentioned arm to effect the oscillatory movement of the arm and the chopping blade thereby.

2. A cotton chopper comprising a main wheel frame, a supplemental frame pivotally supported below the main frame and adapted for vertical movement, ground engaging guide shoes carried by the supplemental frame, an elongated arm, a chopping blade carried by the rear end thereof, a socket member arranged on the forward end of the main frame, a ball shaped head carried by the forward end of said arm, and disposed within said socket, an arm extending laterally from the ball shaped head through the opposite side of the socket, and means for actuating said last mentioned arm to effect the oscillatory movement of the arm and the chopping blades thereby, said last mentioned means comprising a reciprocating pitman, the forward end thereof being provided with a socket, and a ball shaped head carried by the outer end of said laterally extending arm, and disposed within said last mentioned socket.

3. A cotton chopper comprising a main frame, an axle arranged transversely on the rear end thereof, ground engaging wheels mounted on the respective ends of the axle, a socket member supported on the forward end of the frame, an elongated arm, a chopping blade carried by the rear end thereof, a ball shaped head carried by the forward end of said arm and disposed within said socket, an arm extending laterally from the ball shaped head to the opposite side of said socket, a driven shaft supported on said frame adapted to be rotated simultaneous with said wheels, an eccentric mounted on said driven shaft, a pitman rod fixed at its rear end with said eccentric, and a ball and socket connection between the forward end of said pitman rod and the outer end of the laterally extending arm whereby said chopping blade carrying arm is adapted for oscillatory movement.

In testimony whereof I affix my signature.

JOSEPH L. PARKS.